Aug. 15, 1944.   P. G. DUCARPE   2,355,787
PICTURE CHANGING DISPLAY
Filed Dec. 11, 1940   3 Sheets-Sheet 1

INVENTOR
Pierre George Ducarpe
BY
Albert M. Austen
ATTORNEY

Aug. 15, 1944.  P. G. DUCARPE  2,355,787
PICTURE CHANGING DISPLAY
Filed Dec. 11, 1940  3 Sheets-Sheet 2

INVENTOR
Pierre George Ducarpe
BY
Albert M. Austin
ATTORNEY

Aug. 15, 1944.  P. G. DUCARPE  2,355,787
PICTURE CHANGING DISPLAY
Filed Dec. 11, 1940  3 Sheets-Sheet 3

INVENTOR
Pierre George Ducarpe
BY
Albert M. Austin
ATTORNEY

Patented Aug. 15, 1944

2,355,787

UNITED STATES PATENT OFFICE 2,355,787

PICTURE CHANGING DISPLAY

Pierre George Ducarpe, New York, N. Y., assignor to Broadfield Metals Corporation, New York, N. Y., a corporation of Delaware Application December 11, 1940, Serial No. 369,577

12 Claims. (Cl. 40—31)

The invention relates to display devices and, more particularly, to those of the movable type for presenting a plurality of displays in succession.

The invention relates to display devices made up of a plurality of sets of flat tapes or ribbons interwoven basket weave style. The field thus presents a plurality of units or squares, these squares having printed pictures or other displays which fit or register together to form a complete picture or display. When the tapes are moved, the picture units pass out of register and a new set of unit squares are exposed which come into register to form a new picture or display.

The invention relates more particularly to the provision of a display device having a relatively large number of tapes providing a comparatively large number of unit squares and to a mechanical movement for presenting a comparatively large number of pictures or displays in succession from the same series of tapes.

According to a preferred embodiment, the display device is provided with four rollers or cylinders bounding the four sides of the display field, having two sets of tapes extending between opposed rollers and being woven basket weave style between the rollers. At the beginning of a presentation, the tapes may be entirely rolled up on one set of rollers and, as they unroll from the first set and roll up onto the second set, the various pictures are displayed. Each tape may be divided in sections, each section comprising a plurality of sets of units or squares, the several sets in each section being disposed alternately along the tape. Each set of units or squares cooperates with corresponding parts on the several tapes to form a picture. The mechanical movement may be such as to expose spaced sets or pictures in succession when the tapes are running in one direction and then to expose the intermediate sets or pictures when the tapes are moving in the reverse direction. Suitable mechanism is provided for reversing the tapes at the ends of their runs and for stopping the tapes with the squares in register to present the several pictures or displays.

The invention also consists in certain new and original features of construction and combination of parts hereinafter set forth and claimed.

Although the novel features which are believed to be characteristic of this invention may be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents diagrammatically the front of the display device with the tapes in position to present a picture;

Figures 4, 5:
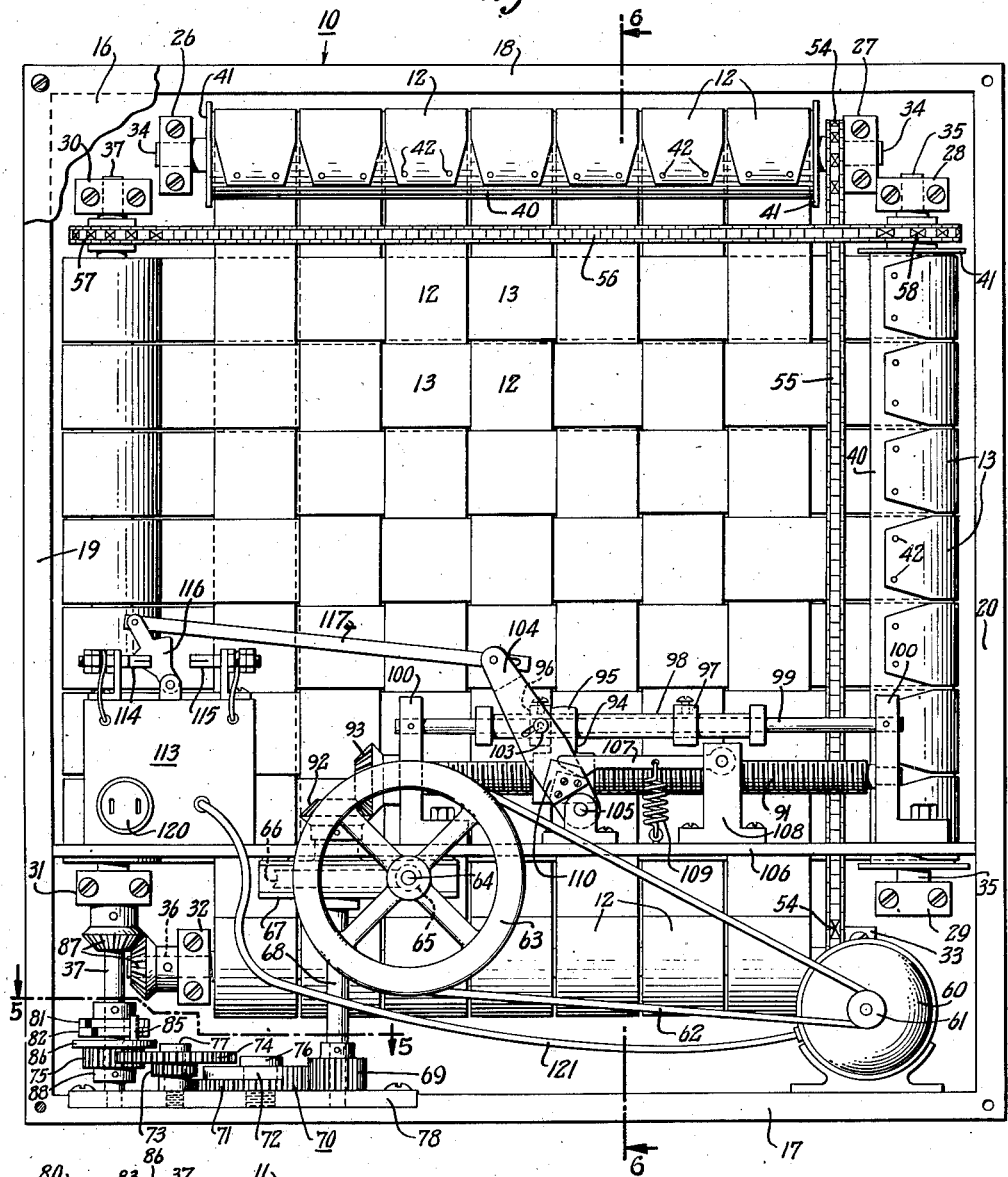
Fig. 4 is a back elevation of the display device.
Figure 6:
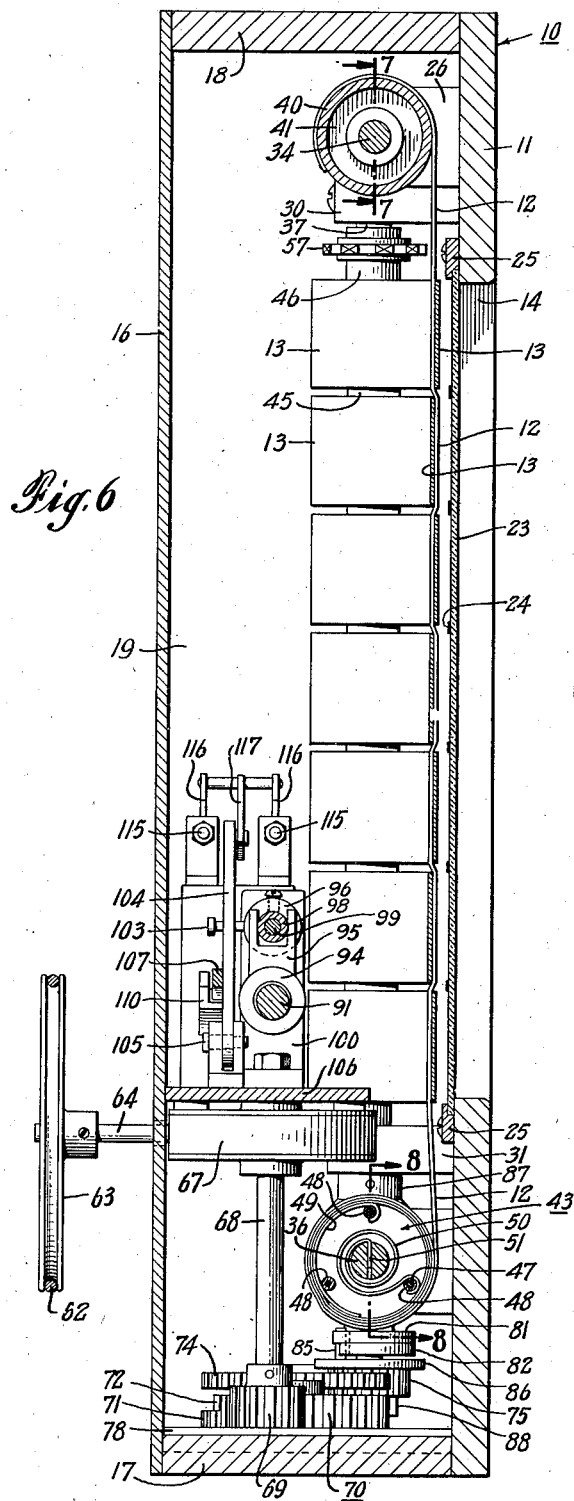
Figure 7:
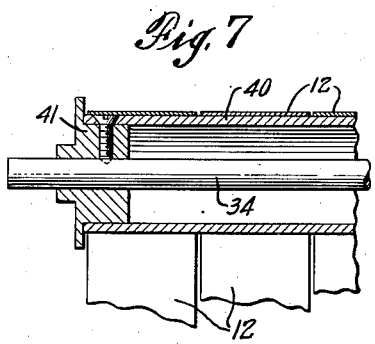
Figure 8:
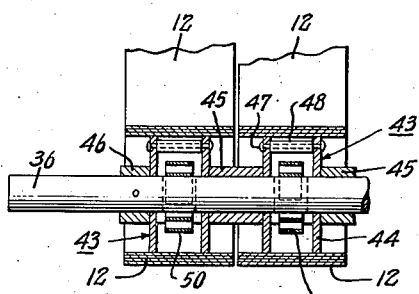

Figs. 5 and 6 are sections taken on the lines 5—5 and 6—6 of Fig. 4;

Figs. 7 and 8 are details taken on the lines 7—7 and 8—8 of Fig. 6; and

Figure 9:
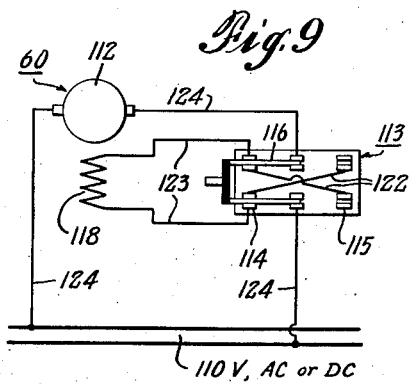

Fig. 9 is a wiring diagram showing one manner of motor control.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Figure 1:
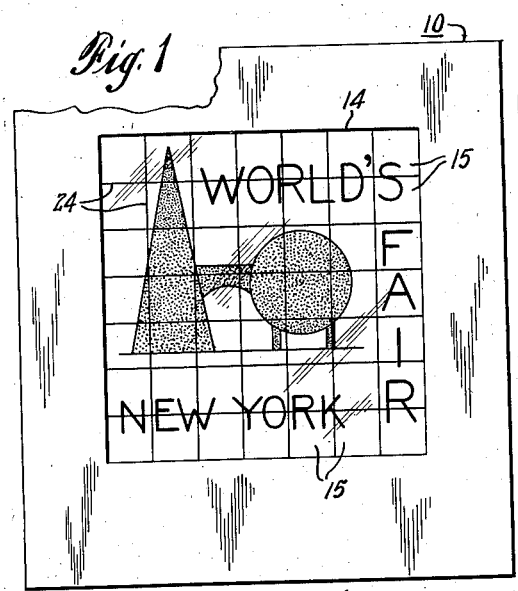
Figure 2:
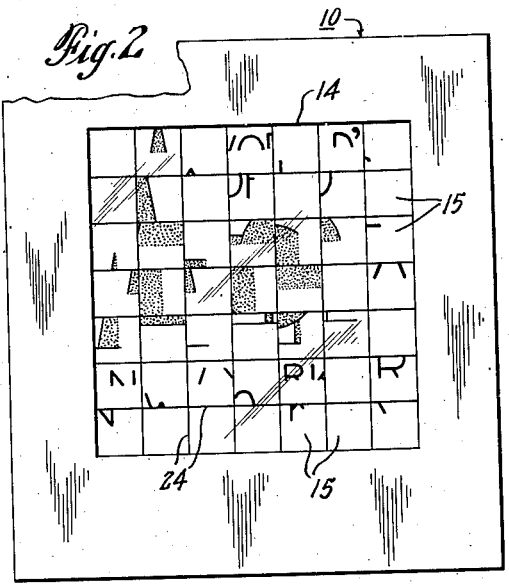
Fig. 2 represents diagrammatically the position of the tapes as they move from one picture presenting position to another.

Referring now to the drawings, the display device comprises, in general, a box 10 having a front or frame 11 provided with a window 14. Sets of tapes 12 and 13 form squares or picture units 15 showing through the window 14. In the form shown for purposes of illustration, there are seven tapes in each set providing forty-nine squares and a total of six different picture presentations is provided for. It will be understood that, after the picture illustrated in Fig. 1 is exposed for a predetermined length of time, the tapes move in unison to bring different areas into register to form the next picture. The changeover from one picture to the next provides a very unique appearance, the picture appearing to dissolve or melt before the eye into a new picture, forming a very attractive display for advertising or the like. Fig. 2 attempts to illustrate the appearance of the display as it is moving from one picture to the next. For purposes of simplicity, however, no attempt has been made to show the second picture, except as a blank field.

Referring now more particularly to Figs. 4 and 6, the box 10 has a back wall 16, bottom wall 17, top wall 18, side walls 19 and 20 secured together and to the front wall 11 in any suitable way. The display opening 14 may be closed by a glass plate 23 secured in position by suitable moulding 25. If desired, the glass plate 23 may have lines of division 24 painted thereon or secured in any other way, for the purpose of masking the spaces between the several tapes 12 and 13. These lines 24 will divide the glass 23 into a series of squares registering with the squares or units formed by the interwoven tapes. As shown particularly in Fig. 4, these tapes may be spaced slightly. In some cases, especially where the tapes are closely spaced, the lines of division 24 may be omitted.

For supporting the four tape rollers, a series of bearings 26—33 are secured to the front wall 11 for the purpose of journalling the shafts 34—37. Top shaft 34 and bottom shaft 36 support the vertical set of tapes 12 and side shafts 35 and 37 support the horizontal set of tapes 13. Since these sets of tapes and their supports are similar, it is only necessary to describe one set in detail.

Shaft 34 supports a roll or cylinder 40 which is supported on the shaft at its end by flanges 41. The tapes 12 are secured to roll 40 by rivets 42, as indicated in the drawings, or by solder when the tapes and cylinder are of metal, or in any other desired way.

The bottom shaft 36 supports a plurality of individual rollers 43, each roller being made up of discs 44 connected by three sleeves 48 through which pass pins 47, the pins being suitably riveted on the discs 44. The several rollers 43 are separated by spacing sleeves 45 and the end rollers are held in position by collars 46 suitably pinned to the shaft 36, as shown especially in Fig. 8.

Secured to the ends of the vertical tapes 12 are end plates or tongues 49 of heavier material, these end plates being bent around one of the sleeves 48 to anchor the tapes in position on the rollers. Each roller has a coil spring 50 having one end 51 disposed in a slot in the shaft 36 and the other end hooked around another of the sleeves 48, as shown especially in the lower part of Fig. 6. Thus, each tape may be individually tensioned by rolling up its roller against the spring 50 and hooking the end plate 49 on one of the sleeves 48.

The upper and lower shafts 34 and 36 are driven in unison and for this purpose have sprockets 54 secured thereto with a chain 55 connecting the sprockets. Thus, the shafts supporting each set of tapes rotate in unison and the take-up devices which include the springs 50 maintain the proper tension on the tapes irrespective of the fact that, as the tapes unroll from one shaft and roll up on the other shaft, the peripheral movement of the tape, corresponding to uniform rotation of the shafts, varies. A similar chain 56 runs on sprockets 57, 58 secured respectively to shafts 37, 35. The chains 55 and 56 may be of flat configuration and the diameters of sprockets 54 are smaller than sprockets 57 and 58 to provide the necessary clearance between the chains 55, 56 where the paths of the chains cross.

The tapes are driven by an electric motor 60 having a pulley 61 driving a pulley 63 by a belt 62. The pulley 63 is mounted upon shaft 64 which drives a worm 65 meshing worm wheel 66 contained in casing 67. The worm wheel 66 is mounted upon shaft 68 which drives pinion 69 (Fig. 5).

Pinion 69 drives special gear 70. This gear has one portion 71 of its periphery continuous, and the other portion 72 of its periphery discontinuous, forming, in effect, two gears. The continuous gear 71 continually meshes pinion 69 but the discontinuous gear 72 intermittently meshes a gear 73. This gear is secured to a gear 74, which in turn drives a gear 75 loosely mounted upon roller shaft 37. Gears 70, 73 and 74 are mounted on stud shafts 76 and 77 secured to plate 78.

A lost motion member, indicated by 80, comprises plates 81 and 82 connected by a slot and screw arrangement 83. These plates 81 and 82 provide for an adjustable recess 84 in which works pin 85. It will be understood that by unloosening the screw 83, the discs 81 and 82 may be rotated slightly with respect to each other to vary the size of the recess 84 or the distance between its ends, against which the pin 85 alternately abuts, as will be explained hereinafter.

The pin 85 is secured to plate 86 which is secured to gear 75, both being loose on the shaft 37 and held in position axially by collar 88. The lost motion member 80 is pinned to shaft 37 so that rotation of gear 75 drives shaft 37. Bevel gears 87 are provided on shafts 37 and 36 to gear the two sets of tapes together so that the two sets move always in predetermined relation to each other.

For reversing the movement of the tapes at the ends of their runs, reversing mechanism is provided to reverse the direction of drive motor 60. A screw shaft 91 has a bevel gear 93 meshing a bevel gear 92 on shaft 68. Screw shaft 91 supports a nut 94 having a forked end 95 (Fig. 6) operating between two collars 96 and 97 on sleeve 98 which is slidable on rod 99. Rod 99 is supported in brackets 100 which also journal the screw shaft 91. Collars 96 and 97 are adjustable lengthwise of sleeve 98 to adjust the exact time with respect to the ends of the tapes at which reversing takes place in each direction.

Collar 96 is provided with a pin 103 working in a slot in lever 104 pivoted to plate 106 by pivot 105. Arm 104 has a beveled edge 110 engageable with a pawl 107 pivoted on bracket 108 and provided with a tension spring 109 for yieldably holding the pawl in engagement with tooth 110, this providing a snap action for the throwing of electric switch 113.

The electric switch 113 is mounted on a suitable support and comprises opposed contacts (jaws) 114 and 115 between which is pivoted a pair of knife blades 116. Blades 116 are connected by a suitable insulating link 117 to arm 104. Thus, when the switch blades 116 engage contacts 114, the motor 60 runs in one direction and when they engage contacts 115, the motor 60 runs in the other direction. A suitable electric cord having a conventional plug 120 is connected to the switch 113 for applying the conventional house current to the device. Insulated wiring 121 connects the motor 60 with the switch 113.

It will be understood that any suitable reversing motor, either A. C. and D. C. or a universal motor, may be used and any suitable reversing switch. In Fig. 9 there is shown diagrammatically a wiring diagram for a universal series wound motor. The armature of the motor is indicated by 112 and the series field by 118. The diagonally opposed contacts 114, 115 are connected by wiring 122 and the contacts 114 are connected to field 118 by wires 123. The blades 116 are connected to the motor armature 112 by wiring 124 which connects with a source of 110 volts—A. C. or D. C.

*Operation and advantages*

Figure 3:
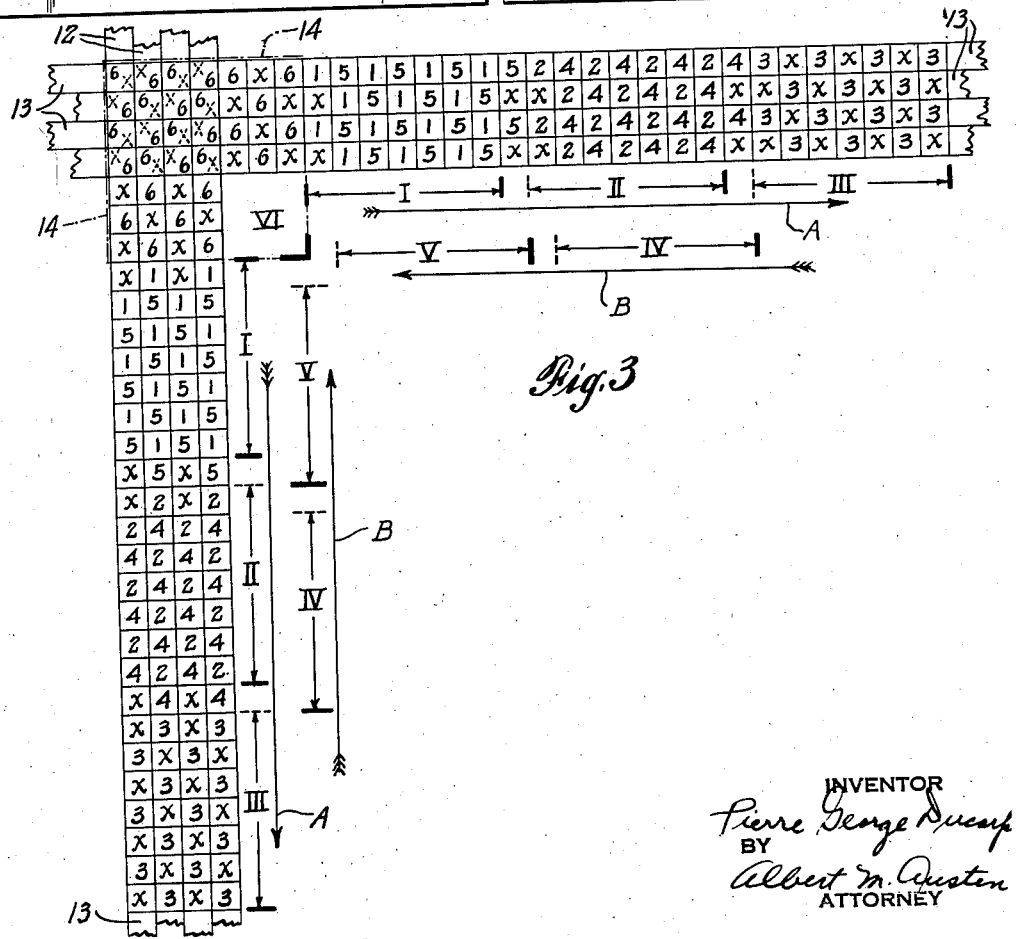
Fig. 3 is a diagrammatic representation illustrating the movement of the tapes.

Before taking up the operation of the gearing and drive for the tapes in detail, it might be well to consider Fig. 3, which represents a development of both sets of tapes, to illustrate how they may be successively exposed to form the successive pictures. Three tapes of each set are omitted for simplicity.

To assist in understanding the invention, it will be assumed that the frame or window 14 moves and that the tapes are stationary. The successive positions of the frame 14 with respect to the tape are indicated by the Roman numerals I, II, III, etc., denoting the several pictures, and the arrows A and B indicate the directions of relative movement of the frame 14.

It will be noted that each tape is divided into a plurality of squares or units, each unit being marked with an Arabic numeral corresponding to the number of the picture it exhibits. Thus, the units or squares marked 1 on both tapes 12 and 13 register to form picture I. Likewise, units or squares 2 register to form picture II and units or squares 3 register to form picture III, and so on.

As stated above, the tapes moving in unison unroll from one roll onto the other roll until the end of the tapes are reached and then the movement is reversed. For simplicity, the movement of the tapes corresponding to the movement of the frame 14, indicated by A in Fig. 3, will be called for convenience the "forward run" and the movement of the tapes corresponding to the movement of frame 14, indicated by B in Fig. 3, will be referred to for convenience as the "reverse run."

As shown in Fig. 3, the tapes have reached the end of their reverse run and picture VI is being displayed. This corresponds to the position of the apparatus in the other figures.

As the tapes change direction for the beginning of their forward run, corresponding to movement of frame 14 in the direction of arrow A, the discontinuous gear 72 tends to move the tapes a distance equal to eight squares, but due to the lost motion action of devices 84, 85, the distance the tapes actually move is only seven squares to display picture I.

For picture II, the tapes move a distance equal to eight squares as indicated by the corresponding position of the frame 14 in Fig. 3. Similarly, for picture III the tapes move eight squares as indicated. The lost motion device 84, 85 measures only one square or unit and introduces its lost motion action only when its direction of movement changes.

At the end of the forward run the motor 60 is again reversed but due to the lost motion connection 84, 85, the tapes are first moved in reverse a distance of only seven squares in the direction of the arrow B to a position indicated by IV. For pictures V and VI, however, the tapes move distances equal to eight squares respectively as indicated.

The operation will be better understood from the following description of the movements of the various parts.

Referring now to Figs. 4, 5 and 6, the tapes are shown wholly wound on the shafts 36 and 37 and show the last picture VI in the reverse run. The motor 60 has just been reversed to drive the tapes on their forward run. The reversal point takes place when the intermittent gear 72 is about half way of its cut-away portion with respect to gear 73. As the motor 60 reverses, the gears 69 and 70 reverse and as the cut-away portion of gear 72 reaches its end, its teeth engage gear 73 which drives gear 74 and gear 75. The pin 85 moves to the left in Fig. 4 through the lost motion slot 84 and, when it engages the left-hand end of slot 84, it starts to drive all of the shafts on their forward run.

The tapes are moved on their forward run a distance corresponding to the toothed segment of discontinuous gear 72 minus a distance corresponding to lost motion segment 84. The length of the toothed segment of gear 72 is so arranged as to bring the next picture I into register at this point where the cut-away segment of discontinuous gear 72 takes effect. Thus, the tapes are stationary while the discontinuous portion of gear 72 freely passes gear 73. The length of time during which the picture is presented is determined by the length of the cut-away portion 72.

When the discontinuous gear 72 rotates sufficiently to bring its teeth again into mesh with gear 73, the tapes are again moved, this time to a position to present picture II. The amount of movement to put picture II in register is determined by the number of teeth on the discontinuous gear 72, but lost motion connection 84, 85 plays no part here since there is no reversal of movement.

The cut-away segment of discontinuous gear 72 determines the length of time picture II is exposed and, when the teeth of gear 72 again mesh gear 73, the tapes move again to bring picture III into register.

When picture III is presented, the tapes have reached the end of their forward run. Nevertheless, discontinuous gear 73 continues to run with its cut-away portion adjacent gear 73 and imparting no motion to the tapes. However, the screw shaft 91 continues to turn, moving the nut 94 against collar 97 which in turn moves sleeve 98 and lever 104 to such position as to bring the pawl 107 on the edge of tooth 110. At this point the switch 113 moves with a snap action, the blades disengaging contacts 114 and engaging contacts 115. The make and break of these contacts is quick to minimize arcing in accordance with well-known electrical engineering practice.

At the time of reversal of motor 60, the intermittent gear 72 has moved only about half way through its cut-away sector. The gear 72 is then reversed to move back through the half of its cut-away sector it has just moved through, so that the picture III is exposed for the same length of time as the other pictures. When the intermittent gear 72 moves sufficiently to again engage gear 73, the gears 74 and 75 are moved in their reverse direction which brings lost motion pin 85 from the left side to the right side of slot 84 (Figs. 4 and 5), at which point the tapes begin to partake of their reverse run. During the reverse run, pictures IV, V and VI are exposed in succession, the time of exposure being determined by the length of the cut-away portion on gear 72 the same as on the forward run.

Thus, the use of an intermittent gear, together with a lost motion connection provides a convenient way of exposing substantially the entire length of tape for the various pictures and for exposing these pictures for equal times. In addition, the several pictures are exposed in rotation, the pictures always occurring in the same order and at the same point in the complete exposure cycle. Thus, on the forward run, for the successive pictures the tapes are moved to expose portions beyond the confines of the frame and on the reverse run similar movement takes place, but due to the lost motion arrangement, the intermediate pictures are exposed. The underlying portions of the interlaced tapes must be utilized, as well as those beyond the confines of the frame, in order to obtain the most economical use of the tapes. It is, therefore, apparent that unequal space movements must be supplied to the tape to present both these parts of the tape.

It will be understood that the principles of this invention are not limited to any particular number of units or squares in any one picture or to any number of presentations or pictures. Although seven tapes in each set and forty-nine squares or units are shown for purposes of illustration, it is obvious that the number of tapes and the corresponding number of units may be greatly increased. In the same way, although only six pictures are shown for purposes of illustration, it is obvious that the tapes may be greatly lengthened and the number of pictures greatly increased.

It will be understood that the tape movement may be modified in different ways to expose all parts of the tape, bearing in mind that it is desirable to expose the underlying portions, as well as those portions out of the field entirely. The particular mechanical movement disclosed, however, has the advantage of not only using the entire length of the tape and providing equal times of exposure and equal changeover periods, but also has the advantage of maintaining the several pictures in a predetermined sequence so that the pictures are shown in true rotation, each picture coming up in the same unvaried order.

It will be noted that each tape is divided into units or squares to make up the several pictures. Each tape may be said to be divided up into sections, each section having two series of squares or units. For example, the alternate squares making up picture I alternate with the squares making up picture V. Similarly, the squares making up pictures II and IV alternate with each other. Thus, the squares making up pictures I and V may be said to occupy a single section and the squares making up pictures II and IV occupy the next section of the tapes.

It will be noted that the end sections of the tapes containing the series making up pictures III and VI have alternate blank spaces indicated by X. Due to the manner of presenting the several pictures, the presence of these blank spaces cannot be avoided, but it is obvious that they are mainly present at the end sections and that the intermediate sections, no matter how many, utilize substantially all of the tapes. The few blank spaces indicated by X between pictures I and II and IV and V are necessary to obtain the proper spacing of the pictures.

So far as I am aware, prior art display devices are either of the type having only two tapes in each set or else are limited to a movement corresponding to one square in each direction and displaying but two pictures. The special tape movement herein disclosed, however, makes possible the use of a greater number than two tapes in each set and the display of an almost unlimited number of pictures or presentations.

While certain novel features of the invention have been disclosed and are pointed out in the annexed claims, it will be understood that various omissions, substitutions and changes may be made by those skilled in the art without departing from the spirit of the invention.

What is claimed is:

1. A picture display device comprising two sets of tapes, each set comprising more than two tapes woven together for portions of their lengths to form a given display, means connecting said sets together for concurrent movement, means for moving said tapes to present successive displays, space measuring devices for moving said sets of tapes by unequal space shifts to present, at times, the underlying portions of said given display and to present at times portions of said tapes lying beyond the confines of said given display.

2. A picture display device comprising two sets of tapes, said tapes being woven together for portions of their lengths to form a display field, the tapes being divided up into display units adapted to register for the several displays, the tapes being further divided into sections corresponding to the different displays, each section comprising a plurality of units of any one tape, a first space measuring device corresponding to the spacing between units, a second space measuring device corresponding to the spacing between sections, and means controlled by said measuring devices for imparting intermittent motions to said tapes to present the different displays.

3. In a picture changing device, a plurality of sets of flexible tapes, each set comprising more than two tapes, portions of said sets being woven to form a display field having more than two units on a side, a prime mover, means for reversing said prime mover, an intermittent driving device driven by said prime mover for shifting said tapes a distance greater than the number of units along one side of said display field, a lost motion device driven by said intermittent device and operative upon reversal of said prime mover for losing a distance corresponding to one unit, and means for driving said sets in unison by said lost motion device.

4. In a display device, a plurality of sets of tapes, portions of said sets being interwoven to form a display field made up of the exposed units of said tapes, a source of power, means for reversing said source, an intermittent driving device driven by said source for shifting said tapes a distance greater than the number of units along one side of said display field, a lost motion device driven by said intermittent device and operative only upon reversal of said motion for losing a distance corresponding to one unit, and means for driving said sets in unison by said lost motion device.

5. The device according to claim 4 in which said intermittent driving device comprises a segment gear driving an ordinary gear and said lost motion device comprises a pin located in a slot.

6. A picture changing display device comprising first and second sets of parallel tapes interwoven to form a display field, each set having a rotatable cylindrical support, a rotatable mandrel opposite said support, a series of independent rollers loosely mounted on said mandrel, individual take-ups between said rollers and said mandrel, said parallel tapes having their one ends secured to said support and their other ends secured to said rollers respectively, means for rotating said support and mandrel in fixed angular relationship, first in one direction and then in the other, said take-ups serving to maintain the proper tension on said tapes to take up the slack which would otherwise occur because of the convolutions of the tapes on the two ends of the tapes occupying different diameters as they wind and unwind.

7. A picture changing display device comprising first and second sets of parallel tapes interwoven to form a display field, each set having a rotatable cylindrical support, a rotatable mandrel opposite said support, a series of independent rollers loosely mounted on said mandrel, said rollers comprising discs connected by cross members, individual coil springs between said cross members and said mandrel, said parallel tapes having their one ends secured to said support and their other ends secured to stiffened end pieces, said end pieces being bent around said cross members, and means for rotating said support and mandrel in fixed angular relationship, first in one direction and then in the other.

8. In a moving display device, a frame having a window, four rotatable supports along the four sides of said window, said supports being geared together for running in unison, two sets of parallel flexible tapes wound on opposite supports and interwoven across said window, an electric motor carried by said frame, reduction gearing driven by said motor, a screw driven by said gearing, a nut on said screw, a reversing switch driven by said nut for reversing said motor, a discontinuous gear driven by said reduction gearing, an ordinary gear driven by said discontinuous gear, and a lost motion connection connecting said ordinary gear and said tape shafts and operative only upon reversal of said motor.

9. In a moving display device, a frame having a window, four rotatable supports along the four sides of said window, said supports being geared together for running in unison, two sets of parallel flexible tapes wound on opposite supports and interwoven across said window, an electric motor carried by said frame, reduction gearing driven by said motor, a reversing switch driven by said reduction gearing for reversing said motor, a discontinuous gear driven by said motor, an ordinary gear driven by said discontinuous gear, and a lost motion connection connecting said ordinary gear and said tape shafts and operative only upon reversal of said motor.

10. In a picture display device, a window, a plurality of sets of tapes having woven relationship forming a field exposed through said window, said field being made up of exposed portions of said tapes in register to form a display, said tapes having portions underlying said exposed portions, each tape being divided into sections made up of two series of picture forming units uniformly spaced along the tape, one series being formed of alternate units, the other series being formed of alternate units lying between the units of said first series, means for imparting a first intermittent motion to said tapes to expose one series of units of the several sections in succession, and means for imparting a second intermittent motion to said tapes to expose the other series of units of said sections in succession.

11. In a picture display device, a window, a plurality of sets of tapes having woven relationship forming a field exposed through said window, said field being made up of exposed portions of said tapes in register to form a display, said tapes having portions underlying said exposed portions, each tape being divided into sections made up of two series of picture forming units uniformly spaced along the tape, one series being formed of alternate units, the other series being formed of alternate units lying between the units of said first series, means for imparting an intermittent motion to said tapes in one direction to expose one series of units of the several sections in succession, and means for imparting an intermittent motion to said tapes in the opposite direction to expose the other series of units of said sections in succession.

12. In a picture display device, a window, a plurality of sets of tapes having woven relationship forming a field exposed through said window, each tape being divided into sections, each section being made up of a plurality of series of picture forming units located along the tape, the corresponding series of units on the several tapes coming successively into register to form successive displays on said field, a first space measuring device corresponding to the distance between units, a second space measuring device corresponding to the distance between sections, and means controlled by said first and second space measuring devices for intermittently driving said sets of tapes in unison.

PIERRE GEORGE DUCARPE.